(12) United States Patent
Hewitt

(10) Patent No.: US 11,232,264 B2
(45) Date of Patent: Jan. 25, 2022

(54) NATURAL LANGUAGE PROCESSING WITH NON-ONTOLOGICAL HIERARCHY MODELS

(71) Applicant: Verint Americas Inc., Alpharetta, GA (US)

(72) Inventor: Timothy James Hewitt, Spokane Valley, WA (US)

(73) Assignee: VERINT AMERICAS INC., Alpharetta, GA (US)

( * ) Notice: Subject to any disclaimer, the term of this patent is extended or adjusted under 35 U.S.C. 154(b) by 12 days.

(21) Appl. No.: 16/657,550

(22) Filed: Oct. 18, 2019

(65) Prior Publication Data

US 2020/0125642 A1   Apr. 23, 2020

Related U.S. Application Data

(60) Provisional application No. 62/747,845, filed on Oct. 19, 2018.

(51) Int. Cl.
*G06F 40/30* (2020.01)
*G06F 40/205* (2020.01)
*G06F 17/18* (2006.01)

(52) U.S. Cl.
CPC .............. *G06F 40/30* (2020.01); *G06F 17/18* (2013.01)

(58) Field of Classification Search
CPC ....................................................... G06F 40/30
See application file for complete search history.

(56) References Cited

U.S. PATENT DOCUMENTS

| | | | |
|---|---|---|---|
| 2008/0228467 A1* | 9/2008 | Womack | G06F 40/30 704/9 |
| 2008/0275694 A1* | 11/2008 | Varone | G06F 40/30 704/9 |
| 2014/0095147 A1* | 4/2014 | Hebert | G06F 16/90332 704/9 |
| 2014/0163959 A1* | 6/2014 | Hebert | G06F 40/30 704/9 |
| 2014/0337306 A1* | 11/2014 | Gramatica | G06F 16/2471 707/706 |
| 2015/0331854 A1* | 11/2015 | Alshinnawi | G06F 40/10 704/9 |
| 2015/0339290 A1* | 11/2015 | Mueller | G06F 16/3344 704/9 |
| 2017/0116985 A1* | 4/2017 | Mathias | G06F 40/35 |

* cited by examiner

*Primary Examiner* — Jialong He
(74) *Attorney, Agent, or Firm* — Meunier Carlin & Curfman LLC

(57) ABSTRACT

A non-ontological hierarchy for language models is based on established psycholinguistic and neuro-linguistic evidences. By using non-ontological hierarchies, a more natural understanding of user's inputs and intents improve toward a better potential for producing intelligent responses in a conversational situation.

15 Claims, 3 Drawing Sheets

NATURAL LANGUAGE PROCESSING WITH NON-ONTOLOGICAL HIERARCHY MODELS

CROSS REFERENCE TO RELATED PATENT APPLICATIONS

This application claims priority to U.S. Provisional Patent Application Ser. No. 62/747,845 filed on Oct. 19, 2018, which is incorporated by reference herein.

FIELD OF THE INVENTION

The invention relates to computerized natural language processing systems for user interfaces accommodating human-machine conversations such as voice activated commands, virtual assistant operations, artificial intelligence training, and the like.

BACKGROUND

An ontology generally specifies relationships between groups of data that represent respective concepts and can be broad and general or bounded by a particular domain of variables. Ontologies are useful for structuring parent to child hierarchies of things. These kinds of structures, however, are not always truly representative of how the human brain creates or processes relationships. Using a different hierarchy model based on the psycholinguistic phenomenon of prototyping instead of ontologies, a hierarchy language model can achieve a more human-like understanding and production of language.

For purposes herein, this disclosure uses birds as one of the examples. Using the standard scientific taxonomy as a prior art ontology for birds, a bird "is a" chordate and a chordate "is an" animal. Thus a robin, as a bird, "is also a" chordate and an animal. Because of this, a bird is as much as an animal as a cow, and a robin is as much of a bird as a penguin. When asked to name an animal, however, a human does not say bird, and when asked to name a bird, a human does not say ostrich (Rosch 1978). In linguistics and psychology, this phenomenon is called prototyping.

The example above still uses the expression "is a" to connote a relationship, but that is only a weak relationship. One might say that a penguin "is a bird," as demonstrated by a previously known correlation between penguins and birds. For example, both have similar attributes, i.e., both birds and penguins have feathers and beaks and they both lay eggs and build nests. By comparison, however, the connection of robins to birds is made stronger by the fact that both birds and robins have strong connections to FLY, SING, and PERCH, to name a few. These words are not strongly connected to the concept of a penguin. In data processing terms, standard ontologies programmed with parent-child relationships have formed a basis for improving results in computer systems that utilize natural language processing and artificial intelligence from natural language inputs. The improved results are directly related to identifying Boolean relationships among natural language inputs from either a human or machine user. This disclosure, however, presents a system and method to steer the automated/computerized decision making in a broader direction that is not strictly subject to pre-programmed Boolean logic ontologies. Instead, the systems and methods discussed in this disclosure utilizes prototyping to represent concepts that are decipherable from not only simple syntax and but also from broader concepts distinguishable by semantic analysis of a natural language input.

Prototyping as noted herein is prevalent in numerous every day language processing. For example, this prototyping can be shown in one test case related to the general concepts in diet. Chickens are defined as birds, but there is a disconnection because people eat chickens, but people do not eat birds. People, especially children, have a disconnect between the meat they eat and the animal they see, e.g., humans eat beef. But humans do not immediately process the word beef with the concept of eating cows, as the language goes.

A need exists, therefore, for modeling out this prototyping for the purposes of natural language processing (NLP) to allow for a more dynamic application without having to define strict and sometimes artificial ontologies to demonstrate relationships. Also, the relationships become much more fluid than the strict parent to child Boolean relationships.

DETAILED DESCRIPTION

Figure 1:
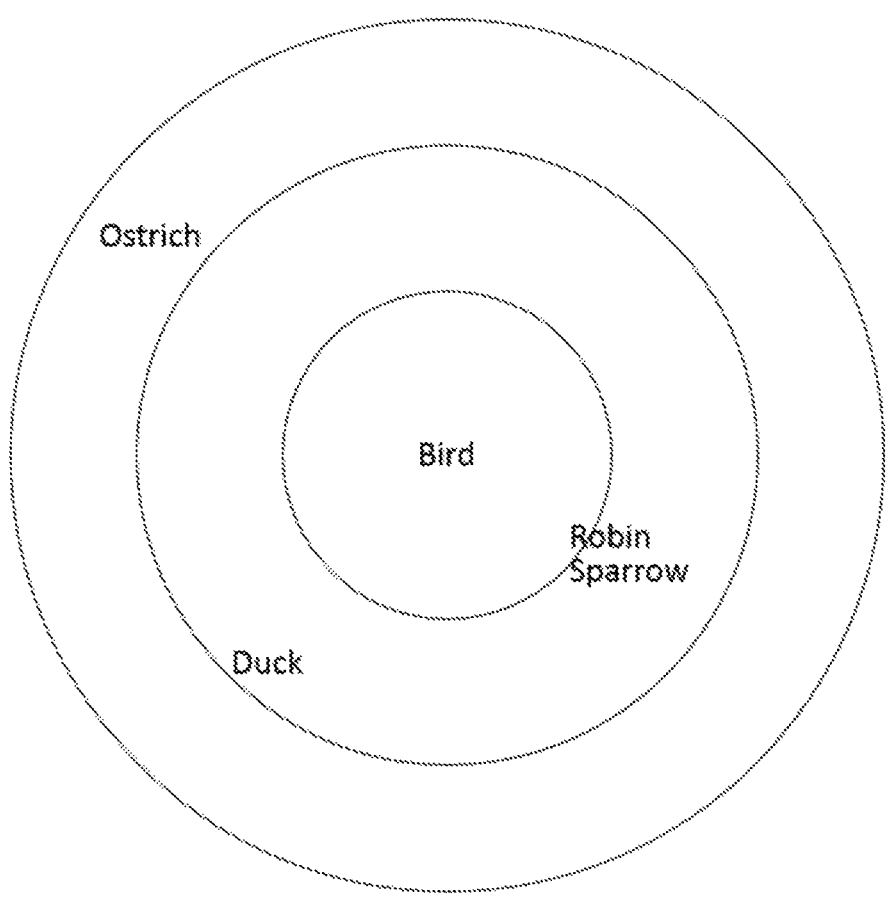
FIG. 1 is an example of a non-ontology of birds. Centrality is a measure of generic terms. The center is the most generic term. This diagram is meant to demonstrate that robins are more closely related to birds than ostriches. It also shows that ostriches, while birds, have little similarity to robins.
Figure 2:
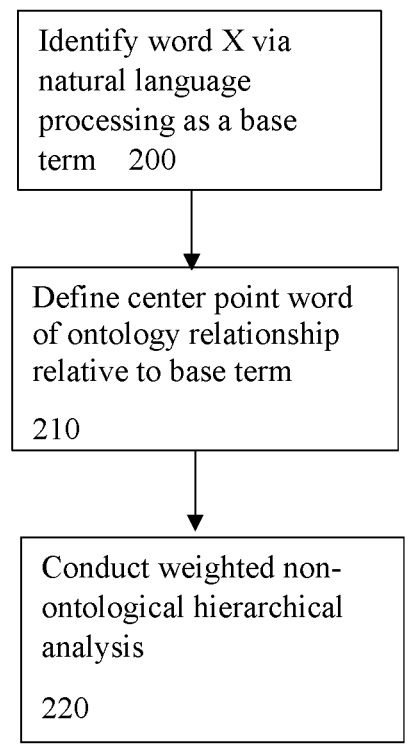
FIG. 2 is a flow chart of a non-ontological system according to this disclosure.
Figure 3:
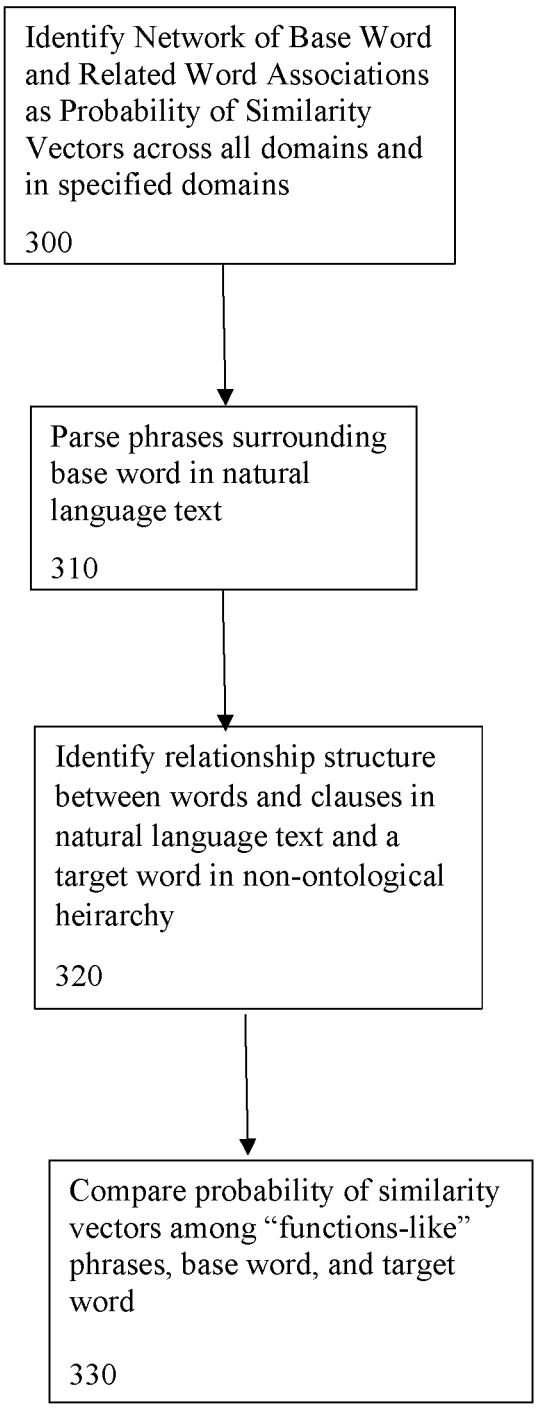
FIG. 3 is a flow chart of a non-ontological system according to this disclosure.

What is hoped is that as relationships are more defined, a pseudo-semantic idea would present on its own in a non-ontological model for natural language processing, or "NLP." The phrase, "throwing a ball," for example, can mean several different things—a toy or an extravagant formal dance. But conversational awareness of the previous or later main verbs, subjects, and objects and computing how these inputs function in the broader context that a user presents as input could further define what kind of ball was thrown.

Also, given this method, a version of the experiential parser may be able to get rid of parts of speech dependencies in natural language processing models and might be able to move to a more realistic abstraction of function which is more independently defined. Instead of the artificial definitions of noun and verb that must be previously defined for tagging an input data stream from a user, the concepts described in this disclosure can create a 'functions-like' relationship definition based on the "action+object," "subject+action," etc. identifications as opposed to the above noted prior art that relies upon the expression "is a" to connote a more traditional parent-child or Boolean relationship between input terms.

Returning to the example, the term "robin," when looking at the data, functions like a bird. Therefore, robin should be of the same functional group as bird which can also fit into the same but broader functional group as all other things that "eat." In this example, as inputs are entered and semantics are considered, the functional groups are self-defining. Essentially, when functional groups can be self-defining, the non-ontological hierarchies for natural language processing eliminates the need for part of speech tagging or reliance.

In order to accomplish these goals, a network of associations 200 would need to exist. In the short term, this disclosure would define non-ontological relationships within natural language inputs as follows with more definitions added as needed. There will likely need to be weights added to these associations, but further research would need to be applied to define what those weights would need to be.

| aX | BE | bY |
| aX | HAVE | bY |
| X | modified-by | bY | aX (action+object|subject+action|subject+object) bY
bY (action|subject|object) aX
previous clause C (action+object|subject+action|subject+object) D
previous clause D (action|subject|object) C
next clause C (action+object|subject+action|subject+object) D
next clause D (action|subject|object) C Using the example of robins, the relationships could be modeled as:

| | robin BE bird | |
| --- | --- | --- |
| Relationship points | robin | bird |
| HAVE | feather | feather |
| HAVE | beak | beak |
| HAVE | wing | wing |
| HAVE | red breast | |
| modified-by | red breasted | |
| modified-by | brown | brown |
| modified-by | | blue |
| action | fly | fly |
| 1 action + object | eat|worms | eat|worms |
| 1 action + object | build|nests | build|nests |
| 2 subject + action | cat|eat | cat|eat |

Looking at shared features, this would return that robin is a good prototype bird. The result is determined not by Boolean logic, prior tagging of certain parts of speech, or specific parent-child hierarchies, but instead the appropriate natural language input can be deciphered, and relationships in the natural language may be identified, in terms of broader functional categories resulting from both syntactical and semantical analyses of functions accomplished by discrete kinds of input.

By this, bugs would be a good prototype for insect and insect would be a good prototype for bug, explaining their interchangeability in language. If one takes into account that spider is also a good prototype for bug, it would also explain why some people refer to spiders as insects, even though it's not correct taxonomy.

Each of these points is not separate. They are connected one to another as well as to the root term. As these connections get stronger or weaker, semantic differences should start to surface.

Also, given this method, a version of the experiential parser may be able to get rid of part-of-speech dependencies and might be able to move to a more realistic abstraction of function which is more independently defined. Instead of the artificial definitions of noun and verb, this method can create a 'functions-like' relationship definition based on the action+object, etc. definitions. Robin, when looking at the data, functions like a bird. Therefore, robin should be of the same functional group as bird which should fit into the same functional group as all other "things that eat" if the functional groups are self-defining.

Creating the Hierarchy

In building out the table above, there would be a statistical measure of relationship between functional items within a natural language input, along with potential domain metrics between base term and related terms in the defined relationship. Those would create probability vectors for the base term in all domains and in specified domains. Accordingly, a raw comparison of collocate structures should give similar terms. Comparing those relationships will give a similarity vector per defined domain/context. It would be relatively pointless to try to compare every word to every other word indiscriminately. It would be better to wait until there is a reason to suspect similarity, such as modified by same terms or modifying the same term.

The preferred method of defining which is the more generic term would be accomplished through evidence in language. Continuing the example, this would be done between robin and bird, by inferring from the aX BE bY, i.e. robins are birds or some birds are robins. Where language does not exist, the hierarchical relationship can and should be manually defined.

Where there is no such hierarchy relationship, this disclosure calls it similarity without hierarchy. Similarity without hierarchy can be used to define a relationship that in the terms of ontology would be like siblings an undefined parent. This would indicate the need for a proto-term, but that term is either undefined or does not exist.

In the situation of aX BE bY and bY BE cZ, an automatic hierarchy 210 is created even though the similarity metric may be below whatever threshold is chosen.

The data points necessary for building out non-ontological hierarchies, or non-ontologies, are simple enough to where they should be extractable via controlled automatic methods over readily available corpora.

Data Structure

In order to create non-ontologies, this disclosure describes a network of associations. A sample of some of these associations are described in Table 1. In building out this table, there would be a statistical measure of relationship, along with potential domain metrics between base term 210 and related terms in the defined relationship 220. Those would create probability vectors 300 for the base term in all domains and in specified domains.

TABLE 1

A sample of association data. Lower case letters indicate modifying term, e.g. payment in payment plan. If a row uses previous clause or next clause all items in that row are applicable to the previous or next clause.

| Base | Relationship | Target |
| --- | --- | --- |
| aB | BE | cD |
| aB | HAVE | eF |
| B | modified-by | gH |
| aB | (action + object|subject + action|subject + object) | iJ |
| kL | (action|subject|object) | aB |
| previous clause M | (action + object|subject + action|subject + object) | N |
| previous clause N | (action|subject|object) | M |
| next clause O | (action + object|subject + action|subject + object) | P |
| next clause P | (action|subject|object) | O |

Method for Extracting Relationships

Automatically creating this dataset with a corpus would rely on some fairly strict n-gram expansion methods or dependency parsers or a combination of both. Examples of structures relating to aB BE cD, would be aB BE cD, some cD BE aB, and cD(plural), like aB, VERB. Examples of structure relating to aB HAVE eF, would be aB HAVE eF, aB's eF, and aB(plural) with eF VERB.

Using a dependency parser to read a corpus and identify and extract these relationships is one possible solution. Another is to use n-gram searches on a part of speech tagged corpus to fill in the slots. Combining the two methods would probably create more reliable results if combining, one probably would not need to first use part of speech tagging in the corpus. If the training corpus has reliable editing standards, most off-the-shelf parsers will be adequate. If relying on a chat-bot corpus, the Experiential Parser is uniquely situated to extract the necessary data from that a-grammatical data. It will probably be important to keep a raw frequency of associations.

Dependency Parser Method

Using a dependency parser 310 to read a corpus, each phrase head has a potential entry B. The other constituents of that phrase that are attached to B are labeled as modifying details a, thus aB. It should be noted that there can multiple aB situations in a single phrase. From there, we look to the other attached roles to see if they match one of our defined structures. If they do, we slot fill in the potential positions. If the positions can't be filled, we move on and don't add the entry to the structure. If it can be moved, all terms are regularized to a root form and added to the structure.

N-Gram Expansion Method

For each term in the corpus, this disclosure relies on part of speech tags and tight directional searches to fill the structures. For example, if term B is a noun, in order to find the modifying details, the methods herein would look to the left for a noun or an adjective in a very narrow window. If multiples are found, the system and method only consider the highest scoring collocate, thus there is only one aB situation produced. While there are grammatical situations where a prepositional phrase attachment can place modifying details to the right, the search window for that would be too large to be predictably safe. Each component of the grammatical structures relating to the data structure would also be searched for in a very confined window. The method and system herein would slot fill as would be done for the dependency parser method and regularize to a root before adding to the data structure. This is the least predictably accurate method, but better than using a dependency parser on non-grammatical, or agramattical, language.

Combined Method

Reading the corpus with a dependency parser, the method and system would only pick modifying details that are greater than the average of the positively valued n-gram relationships. The rest of the process would reflect the dependency parser method. This reduces the available aB structures, but the confidence in the value of the assignment would be much greater. Our data structure wouldn't be as cluttered with lower value relationships.

Method for Building the Non-Ontology

Similarity of the distribution of data points is the basis for the non-ontology. A term can be said to be related to another when a comparison of same relationships to same terms shows a similar distribution excluding the aB BE cD relationship which is used to show a so-called centrality (see FIG. 1 fig: birds). While the FIG. 1 shows two dimensions, in truth, this would be a multi-dimensional similarity vector 330 to other terms and to the center.

The aB BE cD relationship is used to show which term(s) are the center points. By definition, only nouns will have centrality, but not all related nouns will have centrality, and the methods disclosed herein avoid forcing a definition for them as that would lead to some of the same artificiality that exists in present ontologies. For example, rocks and balls will probably show some similarity, but one would not expect a common centrality between them. Similar relationships without centrality will be said to have similarity without hierarchy.

The phrasal structures, as defined by rules like aB "action+object" iJ, should give us functional divisions 320 (e.g., "paint" as a noun) and a will be divided along these lines, and the other relationships would not apply once a division is defined. An example of similarity without hierarchy among verbs would be love and hate. In this case it is the previous and next clauses that will create the semantic differentiation point. These terms would show extreme lexical similarity with possibly extreme contextual difference which would indicate an antonym relationship.

Using the Hierarchy

In the input, "A shmoo flew through my window," the system does not know what a "schmoo" is. But it shares an action of flying and a location of "through window." This would be common with several species of birds and bugs. However, a user only really wants to equate it to the most general term that makes sense. The method and system will stop at birds or insects before equating it with the too generic category of animal.

However, in certain contexts, like "I saw a stork," given the domain of a zoo, animal may be the more appropriate connection to make. In this case, the domain context for the similarity vectors between bird and animal should decrease to nominal. When such differences are nominal, the system may select the most generic term with a specified degree of confidence.

Once the system has both of those situations, the system can predictably say that a "schmoo" functions like a bird or an insect. This "functions-like" definition is what a non-ontological system can use to replace part-of-speech definitions and tags for natural language inputs.

Still sticking with the bird analogy there are some collocates and contexts that don't make sense. "Flipping the bird" only applies to bird, but none of its children. The context should eventually show that flipping birds applies to a different understanding of the term bird. Once that understanding is differentiated, it creates a new bird meaning—one that is completely separate from robins. In this case, the more specific terms are used to differentiate meaning. Where this hierarchy does not exist, the similarity without hierarchy should be able to be used to make similar distinctions.

Language Model as Whole

Because the non-ontological system described herein contains semantic and syntactic information, in one embodiment, the system may rely upon a syntactic framework, similar to the syntax environments in a related experiential parser, to build upon. The aB BE cD relationship is used to show which term(s) are the center points. By definition, only nouns will have centrality, but not all related nouns will have centrality. Forcing a definition for them will lead to some of the same artificiality that exists in present ontologies. For example, rocks and balls will probably show some similarity, but one would not expect a common centrality between them. Similar relationships without centrality will be said to have similarity without hierarchy. The phrasal structures, as defined by rules like aB action+object iJ, should give us functional divisions, for example paint as a noun and a will be divided along these lines and the other relationships would not apply once a division is defined.

Potential benefits of this system and method include, but are not limited to:
- System defines relationships on its own
- More fluid, less rigid hierarchies
- More human-like understanding of relationships of terms
- Hierarchies are less artificial than standard ontologies
- Relationships reflect a distance from the central idea rather than a true/false relationship.

This is one of the more fundamental improvements for the next version of a previously submitted experiential parser. The system of this disclosure provides a path to better automated conversations (e.g., if the user is talking about chirping birds, then the system would not begin talking about chickens or vice versa). This disclosure also presents a potential for better mapping of customer knowledge bases along with a potential for better mapping of user experiences.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, network device may be applicable in other exchanges or routing protocols. Moreover, although network device has been illustrated with reference to particular elements and operations that facilitate the communication process, these elements, and operations may be replaced by any suitable architecture or process that achieves the intended functionality of network device.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. The structures shown in the accompanying figures are susceptible to 3-D modeling and can be described relative to vertical, longitudinal and lateral axes established with reference to neighboring components as necessary.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an "application" as used herein this Specification, can be inclusive of an executable file comprising instructions that can be understood and processed on a computer, and may further include library modules loaded during execution, object files, system files, hardware logic, software logic, or any other executable modules.

In example implementations, at least some portions of the activities may be implemented in software provisioned on a networking device. In some embodiments, one or more of these features may be implemented in computer hardware, provided external to these elements, or consolidated in any appropriate manner to achieve the intended functionality. The various network elements may include software (or reciprocating software) that can coordinate image development across domains such as time, amplitude, depths, and various classification measures that detect movement across frames of image data and further detect particular objects in the field of view in order to achieve the operations as outlined herein. In still other embodiments, these elements may include any suitable algorithms, hardware, software, components, modules, interfaces, or objects that facilitate the operations thereof.

Furthermore, computer systems described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that single processor and a single memory element are responsible for certain activities. In a general sense, the arrangements depicted in the Figures may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory can store data used for the operations described herein. This includes the memory being able to store instructions (e.g., software, logic, code, etc.) in non-transitory media, such that the instructions are executed to carry out the activities described in this Specification. A processor can execute any type of computer readable instructions associated with the data to achieve the operations detailed herein in this Specification. In one example, processors (e.g., processor) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.'

REFERENCES

Rosch, Eleanor, and Barbara Bloom Lloyd, eds. "Cognition and Categorization." (1978).

Davies, Mark. (2008-) The Corpus of Contemporary American English (COCA): 560 million words, 1990-present. Available online at https://corpus.byu.edu/coca/.

The invention claimed is:

1. A computerized system for conducting human-machine conversations, comprising:
   a computer comprising a processor connected to memory storing computer-implemented language processing software comprising a network of associations comprising target words arranged according to functions-like relationship definitions in respective domains of words;
   at least one data structure storing the network of associations in the memory;
   a user interface connected to the computer and configured to receive natural language inputs and to provide responses from the computer using the language processing software, wherein the language processing software implements a method comprising the steps of:
   identifying at least one base term and phrasal structures in a respective natural language input;
   identifying respective functional items in the phrasal structures used with the at least one base term in the natural language input and comparing the respective functional items with the functions-like relationship definitions in the network of associations to identify similarities between the at least one base term and the target words in the network of associations and to identify the respective domain of words that includes the target words;
   computing a response with words from the respective domain of words.

2. The computerized system of claim 1, wherein the target words from the respective domain of words share a prototyped relationship structure with the base words from the natural language input, wherein the prototyped relationship structure shows similarities in which the at least one base term and the target words are both associated with respective functions-like phrases that are present in the phrasal structures of the natural language input and also present in the functions-like relationship definitions of the network of associations.

3. The computerized system of claim 2, further comprising a step of calculating a similarity vector between base words in the natural language input and target words in the respective domain of words.

4. The computerized system of claim 3, wherein the functional items within the phrasal structures of the natural language input identify the base term relative to at least one of an action term from the natural language input, an object of the action term, a subject term from the natural language input, and the subject term performing the action term.

5. The computerized system of claim 3, further comprising narrowing down at least one domain of words from the network of associations by identifying common terms in the respective natural language input and at least one functions-like relationship definition in the network of associations.

6. The computerized system of claim 1 further comprising parsing the natural language inputs and extracting respective base words and functional items from the phrasal structures.

7. The computerized system of claim 6, wherein the parsing further comprises utilizing a computerized dependency parser to identify relationships among a plurality of input words in the natural language input and to store the relationships in the memory.

8. The computerized system of claim 7, further comprising using the computer to determine whether the relationships among the input words fit into at least one phrasal data structure stored in the language processing software.

9. The computerized system of claim 8, further comprising calculating a similarity vector that exhibits a degree of similarity between base words in the natural language input and target words in the respective domain of words.

10. The computerized system of claim 6, wherein the parsing further comprises utilizing directional searches to identify relationships among a plurality of input words in the natural language input and to store the relationships in the memory.

11. The computerized system of claim 10, further comprising using the computer to determine whether the relationships among the input words fit into at least one phrasal data structure stored in the language processing software.

12. The computerized system of claim 11, further comprising calculating a similarity vector that exhibits a degree of similarity between base words in the natural language input and target words in the respective domain of words.

13. A computer implemented method of formulating a computerized response to a natural language input to a computer, the method comprising:
   storing a network of associations between target words arranged according to functions-like relationship definitions in a respective domain of words;
   identifying at least one base term and phrasal structures in a respective natural language input;
   identifying respective functional items in the phrasal structures used with the at least one base term in the natural language input;
   identifying similarities between the at least one base term and the target words in the network of associations by comparing the respective functional items from the natural language input with the functions-like relationship definitions in the network of associations;
   identifying the respective domain of words that includes the target words; and
   computing a response with words from the respective domain of words.

14. The computer implemented method of claim 13 further comprising identifying similarities in which the at least one base term and the target words are both associated with respective functions-like phrases that are present in the phrasal structures of the natural language input and also present in the functions-like relationship definitions of the network of associations.

15. The computer implemented method of claim 13, wherein the target words are placed in functional groups in the network of associations, wherein the target words in a respective functional group share common functions like relationship definitions.

* * * * *